(12) United States Patent
Huber et al.

(10) Patent No.: US 12,325,613 B2
(45) Date of Patent: Jun. 10, 2025

(54) DRIVERLESS TRANSPORT DEVICE AND DRIVERLESS TRANSPORT SYSTEM FOR TRANSPORTING OBJECTS, AND METHOD FOR OPERATING A DRIVERLESS TRANSPORT DEVICE AND A DRIVERLESS TRANSPORT SYSTEM FOR TRANSPORTING OBJECTS

(71) Applicants: IMS GEAR SE & CO. KGAA, Donaueschingen (DE); ANTRIMON (DEUTSCHLAND) GMBH, Aldingen (DE)

(72) Inventors: Matthias Huber, Gutmadingen (DE); Christof Klaiber, Villingen-Schwenningen (DE); Carsten Belz, Oberndorf (DE); Benedikt Nagel, Brigachtal (DE)

(73) Assignees: IMS GEAR SE & CO. KGAA, Donaueschingen (DE); ANTRIMON (DEUTSCHLAND) GMBH, Aldingen (DE)

( * ) Notice: Subject to any disclaimer, the term of this patent is extended or adjusted under 35 U.S.C. 154(b) by 411 days.

(21) Appl. No.: 17/772,864

(22) PCT Filed: Sep. 28, 2020

(86) PCT No.: PCT/EP2020/077113
§ 371 (c)(1),
(2) Date: Apr. 28, 2022

(87) PCT Pub. No.: WO2021/083594
PCT Pub. Date: May 6, 2021

(65) Prior Publication Data
US 2022/0363526 A1 Nov. 17, 2022

(30) Foreign Application Priority Data
Oct. 29, 2019 (EP) .................................... 19205983

(51) Int. Cl.
*B66F 9/06* (2006.01)
*B25J 5/00* (2006.01)
(Continued)

(52) U.S. Cl.
CPC ............... *B66F 9/063* (2013.01); *B25J 5/007* (2013.01); *B66F 9/065* (2013.01); *B66F 9/185* (2013.01);
(Continued)

(58) Field of Classification Search
CPC ...... B25J 5/007; B25J 11/008; B25J 15/0047; B66F 9/063; B66F 9/065; B66F 9/185; B66F 9/145; B65G 1/0471
See application file for complete search history.

(56) References Cited

U.S. PATENT DOCUMENTS 3,435,965 A 4/1969 Scharft et al.
6,104,314 A 8/2000 Jiang
(Continued)

FOREIGN PATENT DOCUMENTS

CN 107175641 A 9/2017
CN 108927785 A 12/2018
(Continued)

OTHER PUBLICATIONS

Search report issued May 11, 2020, in corresponding European application No. 19205983.0.

*Primary Examiner* — James Keenan
(74) *Attorney, Agent, or Firm* — Nath, Goldberg & Meyer; Jerald L. Meyer; Ilirian Durri (57) ABSTRACT

The present invention relates to a driverless transport device (10) for transporting objects (38), comprising a support structure (12) with an outer contour (14), a chassis (16) fastened to the support structure (12) having at least a first wheel (18) and a second wheel (20), wherein the first wheel
(Continued)

(18) is rotatably mounted in the chassis (16) about a first axis of rotation (D1) and the second wheel (20) is rotatably mounted in the chassis (16) about a second axis of rotation (D2), a drive unit (22) with which the first wheel (18) and the second wheel (20) can be driven independently of each other, and an expanding unit (98) with at least one expanding arm (100), wherein expanding arms (100) are adjustable by means of an adjustment unit (106) between a first position, in which the expanding arms (100) are located within the outer contour (14), and a second position, in which the expanding arms (100) project at least partially beyond the outer contour (14). Furthermore, the invention relates to a driverless transport system (81), comprising a plurality of such driverless transport devices (10).

12 Claims, 7 Drawing Sheets (51) Int. Cl.
  B66F 9/065 (2006.01)
  B66F 9/18 (2006.01)
  B25J 13/00 (2006.01)
  B66F 9/075 (2006.01)
(52) U.S. Cl.
  CPC ........... *B25J 13/006* (2013.01); *B66F 9/0755* (2013.01); *B66F 9/07559* (2013.01)

(56) References Cited

U.S. PATENT DOCUMENTS

| | | | |
|---|---|---|---|
| 8,939,486 B2* | 1/2015 | Gorham | B25J 15/10 |
| | | | 294/93 |
| 9,707,879 B2* | 7/2017 | Mecklinger | B66F 9/063 |
| 9,878,448 B2* | 1/2018 | Kang | B25J 9/0084 |
| 9,890,025 B2* | 2/2018 | Colantonio | B66F 9/063 |
| 10,328,836 B2* | 6/2019 | Purwin | B25J 5/007 |
| 10,581,038 B2* | 3/2020 | Neumann | A47L 9/2884 |
| 10,647,559 B2* | 5/2020 | Schwarz | B66F 9/18 |
| 10,902,880 B2* | 1/2021 | Pajevic | B66F 9/063 |
| 2014/0058556 A1 | 2/2014 | Kawano | |
| 2020/0339348 A1* | 10/2020 | Durai | B65G 65/00 |
| 2022/0144546 A1* | 5/2022 | Tendo | B66F 9/063 |

FOREIGN PATENT DOCUMENTS

| | | | | |
|---|---|---|---|---|
| DE | 10229270 A1 * | 1/2004 | | A63B 55/61 |
| FR | 1304758 A | 9/1961 | | |
| FR | 2556330 A1 * | 6/1985 | | B66F 9/185 |
| GB | 2542472 A | 3/2017 | | |
| WO | 2016/172793 A1 | 11/2016 | | |
| WO | 2019063816 A1 | 4/2019 | | |
| WO | 2019/095804 A1 | 5/2019 | | |

* cited by examiner

DRIVERLESS TRANSPORT DEVICE AND DRIVERLESS TRANSPORT SYSTEM FOR TRANSPORTING OBJECTS, AND METHOD FOR OPERATING A DRIVERLESS TRANSPORT DEVICE AND A DRIVERLESS TRANSPORT SYSTEM FOR TRANSPORTING OBJECTS

This is a National Phase Application filed under 35 U.S.C. 371 as a national stage of PCT/EP2020/077113 filed Sep. 28, 2020, an application claiming the benefit of European Application No. 19205983.0 filed Oct. 29, 2019, the content of each of which is hereby incorporated by reference in its entirety.

The present invention relates to a driverless transport device and a driverless transport system for transporting objects. Furthermore, the invention relates to a method for operating a driverless transport device and a driverless transport system for transporting objects.

In the course of the advancing digitalization of industrial processes, the transport of objects is also increasingly automated. For this purpose, so-called driverless transport devices and driverless transport systems (DTS) are used, which are also referred to as "Automated Guide Vehicles" (AGV). In driverless transport systems, a plurality of driverless transport devices is combined and operated like a swarm. Driverless transport systems are used, in particular, in logistics and manufacturing, where various objects, for example semi-finished products or other components, must be transported from a first location to a second location. In this, trucks, for example, can be loaded and unloaded automatically.

In many cases, the objects are transported by means of load carriers, for example boxes, crates or pallets. A driverless transport system is known from DE 10 2013 017 062 A1, which has two conveyor skids that can be inserted into the elongated cavities of a pallet in the manner of a fork of a forklift truck. The conveyor skids have a lifting device with which the pallet can be lifted slightly off the ground and then transported to the desired location and lowered again there.

On the basis of the fact that the conveyor skids have a significantly greater extension in the longitudinal direction compared to the transverse direction, maneuverability is limited, in particular, by the fact that there must be sufficient space in front of the pallet for the conveyor skids to be aligned with the cavities. The device shown in EP 2 765 101 A1 also has a similar extension to the previously mentioned conveyor skids, so that, here as well, limited maneuverability results.

Another driverless transport system is described in DE 10 2013 101 561 A1 and DE 20 2014 104 780 U1, which use reference marks that specify the path along which the driverless transport system can be moved. This results in limited flexibility since use outside the reference marks is not possible. Moreover, relocating the reference marks requires considerable effort.

As mentioned, a driverless transport system is known from DE 10 2013 017 062 A1, which has two conveyor skids that can be inserted into the elongated cavities of a pallet in the manner of a fork of a forklift truck. However, if the two conveyor skids are not precisely aligned parallel to each other and along the longitudinal axis of the elongated cavities of the pallet, at least one conveyor skid must be counter-steered even if the pallet is to be moved straight ahead, which leads to friction and abrasion.

The task of one embodiment of the present invention is to propose a driverless transport device for transporting objects, which can be easily integrated into existing transport processes, provides good maneuverability and additional not yet available functions. Furthermore, an embodiment of the present invention is based on the task of being able to realize a reproducible alignment of the transport device with respect to the pallet, in particular in the case where pallets are transported.

This task is solved with the features indicated in the advantageous embodiments of the present subject matter.

One embodiment of the invention relates to a driverless transport device for transporting objects, comprising
 a support structure with an outer contour,
 a chassis fastened to the support structure having at least a first wheel and a second wheel, wherein the first wheel is rotatably mounted in the chassis about a first axis of rotation and the second wheel is rotatably mounted in the chassis about a second axis of rotation,
 a drive unit with which the first wheel and the second wheel can be driven independently of each other, and
 an expanding unit with at least two expanding arms, wherein the expanding arms are adjustable between a first position and a second position by means of an adjustment unit and the expanding arms in the second position project at least partially beyond the outer contour.

The expanding unit has the following functions: In particular, if the driverless transport device is to be used for transporting pallets, it is moved into the elongated cavity of the pallet. In this state, the expanding arms are in the first position, in which they are conveniently located within the outer contour. The outer contour is to be understood as the outer edge of the support structure, wherein the outer edge of the support structure can also be formed by a housing. In this respect, the expanding arms in the first position do not protrude beyond the outer contour and do not obstruct the entry into the elongated cavity of the pallet. Once the driverless transport device has reached the desired position within the elongated cavity of the pallet, the expanding arms are moved to the second position. The radially outer ends of the expanding arms come into contact with the side walls of the elongated cavity of the pallet, which, on the one hand, causes the driverless transport device to jam with the pallet and, on the other hand, causes a defined orientation of the driverless transport device with respect to the pallet. It is expedient to align the driverless transport device with respect to the pallet in such a way that the axes of rotation of the two wheels are perpendicular or nearly perpendicular to the longitudinal axis of the elongated cavity of the pallet. If the pallet is to be moved from one location to another, the pallet is then moved primarily in a straight line. In this case, the driverless transport device does not need to counter-steer in a corrective manner, so no friction or slippage caused by counter-steering is applied to the two wheels. The loads acting on the driverless transport device during operation are reduced compared with known driverless transport devices by the expanding unit. It makes sense for the expanding unit to be implemented rotatable to the chassis, but this does not necessarily have to be the case.

According to a further embodiment, the expanding unit comprises a further drive unit and a drive train with which the further drive unit interacts with the adjustment unit. In principle, it would be possible to also use the drive unit with which the first wheel and the second wheel can be driven to drive the adjustment unit. However, the drive train would then become relatively complex. The fact that the driverless transport device in this embodiment has a further drive unit with which the adjustment unit of the expanding unit can be driven simplifies the construction of the drive train.

According to a further development, a decoupling unit is arranged in the drive train, with which the further drive unit can be separated from the adjustment unit. As mentioned, the expanding arms serve to brace the transport device in the extended state with the object to be transported, in particular with a pallet, in order to prevent uncontrolled slippage. However, it would then not be possible to rotate the transport device in the clamped state, in particular for steering, because otherwise the resistance in the drive train and in the other drive unit would have to be overcome. The decoupling unit can be used to open or close the drive train as desired. In the open state, the further drive unit is separated from the adjustment unit. The transport device can therefore be rotated with minimal effort even when it is clamped to the object to be transported, in particular to the pallet, using the expanding arms.

A further developed embodiment is characterized in that the expanding unit comprises a locking device with which the adjustment unit can be locked at least when the expanding arms are in the second position. In this embodiment, the further drive unit is not required to apply the retaining force to keep the expanding arms in the second position. The locking device takes care of applying the retaining force, for example, through engagement by means of a locking pin or the like. The further drive unit can be switched off during this time, which also reduces energy consumption and the load on the further drive unit.

According to a further embodiment, the expanding unit has an angle sensor with which the rotational position of the expanding arms can be determined in relation to the first axis of rotation and/or the second axis of rotation. Instead of the axes of rotation, other reference axes of the chassis or the support structure can also be selected. However, the axes of rotation are particularly suitable as reference axes because they specify the direction of travel of the transport device. As mentioned, the expanding unit is used to clamp the transport device to an object, in particular to a pallet. In particular, if the transport device has a decoupling device, the transport device can be rotated under the pallet without having to set the expanding arms in the first position and for the clamping to be released. With the help of the angle sensor, it can be determined in which rotational position the expanding unit is in relation to the axis of rotation. This makes it possible to align the expanding arms in relation to the object with which the transport device is to be clamped in such a way that the expanding arms come into contact with the surfaces of the object as parallel as possible. Warping is prevented.

A further embodiment is characterized in that the adjustment unit comprises a synchronization unit with which the movement of the expanding arms can be synchronized. In this embodiment, the expanding arms move simultaneously, so that the time required for jamming and aligning the driverless transport device, for example, in the elongated cavity of a pallet, is kept to a minimum. In addition, the alignment of the driverless transport device is thereby facilitated, and warping is prevented.

According to a further embodiment, the adjustment unit, with which the expanding arms can be adjusted, and which can be actuated with the synchronization unit in a synchronized manner, can comprise one toggle lever unit for each expanding arm. Making use of a toggle lever unit, it is possible to move the expanding arms between the first and the second position in a simple manner. In particular, the toggle lever unit can be built flat so that it requires little installation space.

In a further embodiment, the synchronization unit may comprise a connecting link disc that interacts with the toggle lever units. A toggle lever unit consists of at least two rotatably connected legs. The axes of rotation about which the two legs are rotatably connected to each other may engage the connecting link disc, whereby the movement of the expanding arms may be synchronized by a rotation of the connecting link disc. It is possible to dispense with a transmission or the like to synchronize the movement of the expanding arms.

In a further developed embodiment, the expanding arms can be mounted in a displaceable manner in guide rails extending radially outward from the center of the driverless transport device. In this embodiment, from a design point of view, the movement of the expanding arms between the first position and the second position can be specified by simple means. In the event that the driverless transport device has two expanding arms, it is possible to have them move along the same axis between the first and second positions. It is possible to align the movements of the expanding arms with each other by means of the guide rails.

In a further developed embodiment, the expanding arms can be elastically connected to support elements at their radially outer ends. The support elements come into contact with the side walls of the elongated cavity of the pallet or with surfaces of other objects to be transported. Due to the fact that the support elements are elastically connected to the expanding arms, the support elements gently strike the side walls or the surfaces, so that no shock-like loads act on the expanding arms. This protects the driverless transport device and in particular the expanding unit.

Pallets, in particular, are often not manufactured very precisely. In addition, the dimensions of the pallets can change during use, for example, due to the effects of moisture or abrasion.

Such deviations in dimensions can be compensated for by the elastic connection of the support elements.

In a further embodiment, the expanding arms can be connected at their radially outer ends to a stop element, wherein the stop element in the first position rests against a stop element of at least one further expanding arm and/or against a stop surface of the support structure. The stop elements determine the first position, so that the first position is clearly defined. The stop element can stop against the support structure. However, it is equally possible for a stop element to abut against at least one further stop element.

According to a further embodiment, the driverless transport device comprises a lifting device interacting with the support structure for raising and lowering at least one support section, which interacts with the same for transporting the objects. In principle, it is possible to place the object to be transported on the driverless transport device, for example by means of a crane or a forklift truck, in order to subsequently move the object to the desired destination. In this case, however, it is necessary to lift the object to be transported in order to remove it from the ground. The driverless transport device can also be used to move objects that have rollers themselves, such as hospital beds or trash cans. These objects do not necessarily need to be lifted in order to move them.

By means of the lifting device, it is, however, possible to move the driverless transport device into a corresponding recess of the object to be transported, for example, into the aforementioned elongated cavity of the pallet, wherein the pallet is still standing on the floor. When the driverless transport device is in the desired position, the lifting device is activated, whereby the pallet is lifted from the ground. The expanding unit is then activated so that the driverless transport device can align itself with the pallet. For this purpose, the support section is rotatably mounted in the support structure so that it can be rotated relative to the housing. In addition, the driverless transport device is frictionally connected to the pallet so that slippage of the pallet relative to the driverless transport device can be largely avoided. This can be particularly relevant if the pallet is to be transported along an inclined base. It is therefore also possible to transport objects without first lifting them and placing them on the driverless transport device. It is, furthermore, also possible to transport objects which do not have rollers or the like themselves, and therefore cannot be pulled.

According to a further embodiment, the outer contour of the support structure is substantially rotationally symmetrical about a rotational axis in a top view, wherein the support section and/or the first wheel and the second wheel are arranged within the outer contour or are flush with the outer contour and/or the expanding arms are arranged within the outer contour when in the first position. The first and the second axis of rotation are usually substantially parallel to a base, upon which the first wheel and the second wheel roll. This base is, for example, the loading surface of a truck or the floor of a workshop. The rotational axis is intended to be substantially perpendicular to the base in the intended use of the driverless transport device, in particular when the driverless transport device rolls on the base. The outer contour is to be understood to be the outer edge of the support structure, wherein the outer edge of the support structure can also be formed by a housing.

In a further developed embodiment, the transport device may comprise a sensor unit for sensing the environment of the transport device, wherein the sensor unit is arranged in a sensor section bounded by the outer contour and the first axis of rotation or the second axis of rotation, and the sensor unit is configured in such a way as to sense only the portion of the environment on the side of the first axis of rotation or the second axis of rotation on which the sensor unit is arranged.

Driverless transport devices known from the state of the art have sensor units with which the immediate environment can be sensed. For example, obstacles can be identified, and appropriate countermeasures initiated. Depending on the type of obstacle, it can be avoided, or the driverless transport device can be halted. Since driverless transport devices pose considerable risk to people in the vicinity, and in order to ensure smooth operation, the environment must continuously be monitored. Consequently, the sensor unit must be able to sense 360° of the environment. The sensor technology required for this is comparatively complex.

In this embodiment, the sensor unit is arranged in such a way that it can sense a maximum of 180° of the environment. Since the outer contour can be designed to be rotationally symmetrical, and the driverless transport device can be rotated more or less on the spot, it is, in particular, not necessary to move backwards. It is, therefore, sufficient to sense only 180° of the environment. The sensor unit is arranged in such a way that the environment lying in front of the driverless transport device in the direction of travel is sensed. As a result, the sensor unit can be constructed much more simply, and the corresponding driverless transport device can be more cost-effective.

In a further developed embodiment, the transport device may comprise a storage device for electrical energy, which, in a top view, protrudes in sections beyond the outer contour of the support structure, wherein the storage device is movably fastened to the support structure.

In turn, the top view refers to the intended use, in which the first wheel and the second wheel roll on a support. Accordingly, in the top view, one looks along the previously mentioned rotational axis. Depending on the embodiment, the outer contour may be rotationally symmetrical to the rotational axis, so that when the driverless transport device rotates about the rotational axis, no eccentric sections can, for example, strike the walls of the cavities of a pallet. The storage device for electrical energy, which, for example, is required to drive the wheels and to operate the sensor unit, protrudes in sections beyond the outer contour of the support structure, so that the storage device forms an eccentric section. In so doing, this allows the space enclosed by the storage device and its charging capacity to be increased. However, there is a risk that the storage device will strike adjacent objects, for example the aforementioned walls of the cavities of a pallet, when rotating. However, the storage device is movably fastened to the support structure, so that if it were to then, for example, strike the walls of the cavities of a pallet, it does not interfere with the further rotation of the driverless transport device. Consequently, in this embodiment, the charging capacity of the storage device can be increased without limiting the maneuverability of the driverless transport device.

In a further embodiment, the storage device can be fastened to the support structure so that it can rotate about the rotational axis. In particular, if the outer contour of the support structure is rotationally symmetrical with respect to the rotational axis, it is possible to also attach the storage device to the support structure so that it can rotate about the rotational axis. For this purpose, an annular groove can be provided in which the storage device engages positively with an appropriately designed projection. If the driverless transport device is to be rotated on the spot and the storage device abuts against an adjacent object, the rotation is, in particular, not impeded.

According to a further embodiment, the storage device is releasably fastened to the support structure. The releasable attachment of the storage device to the support structure enables the charging process to be simplified. In particular, a drained storage device can be replaced with a fully charged storage device within a short time. The drained storage device can be charged during the time when the fully charged storage device ensures the operation of the driverless transport device. The exchange of a drained storage device for a fully charged storage device can be automated, so that on the one hand the exchange can take place in a timely manner and on the other hand with only a small interruption of the operation and without the assistance of a user.

One configuration of the invention relates to a driverless transport system comprising
    a plurality of driverless transport devices according to any of the previous embodiments,
    a control unit for controlling or regulating the driverless transport devices, and
    a communication device with which information can be exchanged between the control unit and the driverless transport devices.

The driverless transport system comprises a plurality of driverless transport devices, wherein the number can be chosen arbitrarily. The minimum number should be two.

Depending on the objects to be transported, a number of three or four transport devices will be most suitable. However, the transport system can also comprise several subgroups of, for example, four transport devices each, whereby the number of transport devices of the subgroups does not need to be the same.

In order to be able to transport objects with a plurality of driverless transport devices, these must be coordinated, which is the purpose of the control unit. In addition, information must be exchanged between the control unit and the driverless transport devices in order to implement the coordination, which is the purpose of the communication device. The communication device can use a wireless network, for example a WLAN network, a Bluetooth network or the like. For this purpose, each of the transport devices and the control unit have a transceiver unit. This transceiver unit can also be used in the manner of a relay station and operated as a repeater to maintain the stability of the WLAN network. In particular, if some of the transport devices are located behind goods, the WLAN network may not be sufficient. The repeater function strengthens the WLAN network even in areas with a weak WLAN network.

The tasks that the driverless transport system should perform can be defined in the control unit. In particular, the objects to be transported can be identified. In addition, the current location and the destination location of the objects to be transported can be defined.

Figure 1A:
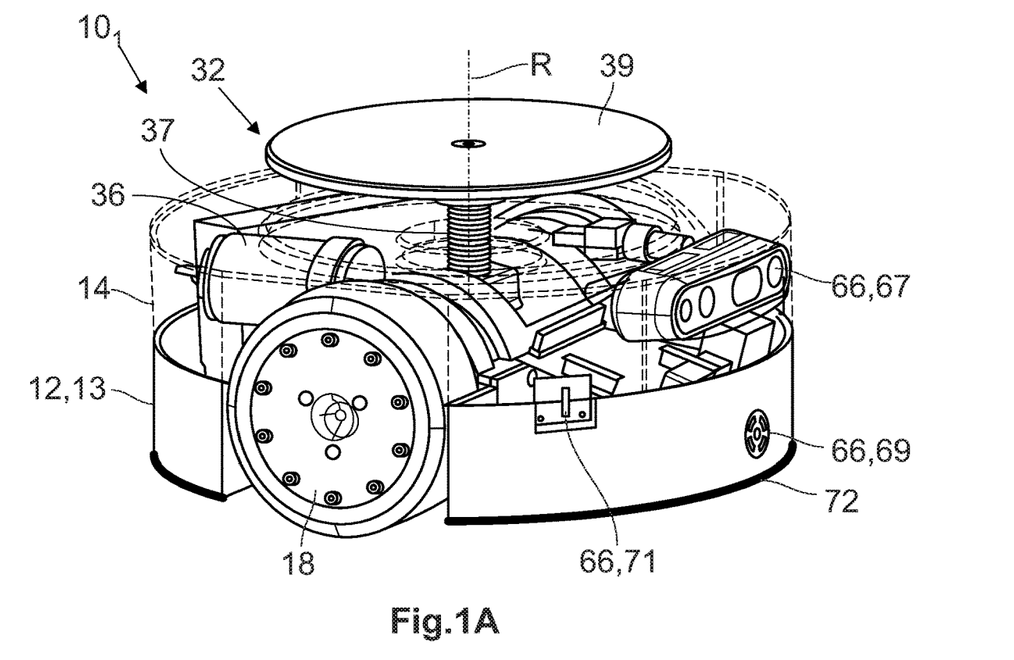
FIG. 1A shows a perspective representation of a first embodiment example of a transport device according to the invention for transporting objects.
Figure 1B:
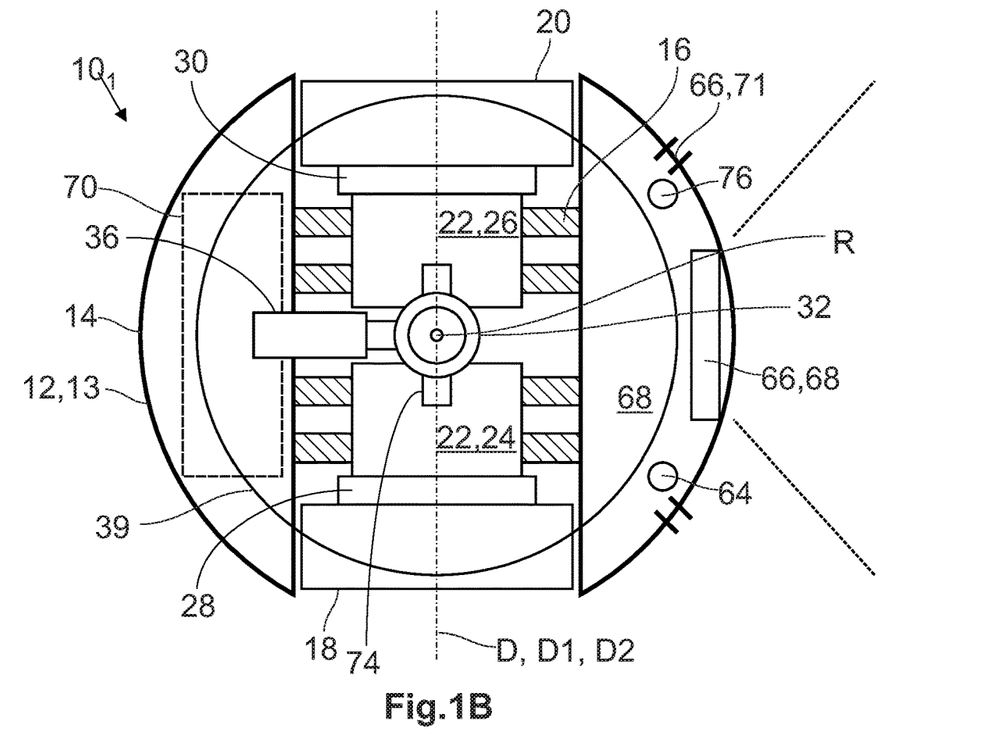
FIG. 1B shows a basic top view, not to scale, of the transport device embodiment example shown in FIG. 1A.

FIG. 1A and FIG. 1B show a first embodiment example of a transport device $10_1$ according to the present invention. The transport device $10_1$ is shown by means of a perspective view in FIG. 1A, whereas a top view of the transport device $10_1$ shown in FIG. 1A is reproduced in FIG. 1B, wherein FIG. 1B is not to scale and is only of a basic nature.

The transport device $10_1$ has a support structure 12, which in the present embodiment example is formed by a housing 13, which comprises an outer contour 14. The outer contour 14 designates the outer surfaces and edges of the support structure 12 or of the housing 13. A chassis 16 is fastened to the support structure 12, in which chassis a first wheel 18 and a second wheel 20 are rotatably mounted about a first axis of rotation D1 and a second axis of rotation D2. In the illustrated embodiment example, the first axis of rotation D1 and the second axis of rotation D2 coincide so that a common axis of rotation D exists.

The transport device $10_1$ further comprises a drive unit 22, which is also fastened to the support structure 12. In this case, the drive unit 22 comprises a first drive motor 24 and a second drive motor 26, wherein the first drive motor 24 is arranged adjacent to the first wheel 18 and the second drive motor 26 is arranged adjacent to the second wheel 20. The first drive motor 24 is connected to the first wheel 18 by a first transmission 28 and the second drive motor 26 is connected to the second wheel 20 by a second transmission 30, so that the rotational motion provided by the first drive motor 24 and the second drive motor 26 can be respectively transmitted directly to the first wheel 18 and the second wheel 20. The first drive motor 24 can be actuated independently of the second drive motor 26, so that the first wheel 18 and the second wheel 20 can also be driven in different directions and at different speeds, allowing the transport device $10_1$ to be rotated.

Figure 3A:
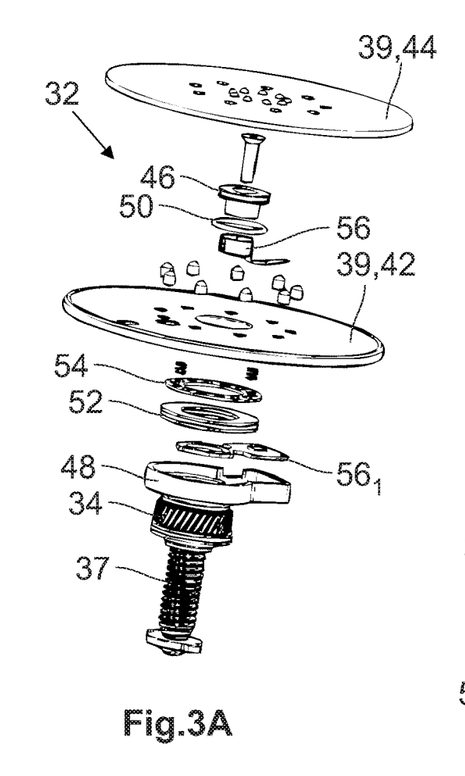
FIG. 3A shows an isolated and perspective exploded representation of a lifting device of the transport device.

Furthermore, the transport device $10_1$ comprises a lifting device 32, which is shown separately in FIG. 3A. The lifting device 32 is provided with a spindle nut 34 that can be rotated about a rotational axis R by means of a third drive motor 36. The rotational axis R is perpendicular to the common axis of rotation D and vertical during the intended use. The spindle nut 34 interacts with a non-rotatable spindle 37, which in turn is connected to a support section 39, which in the first embodiment example of the transport device $10_1$ is designed in the manner of a rotary plate, which is rotatable relative to the housing 13. If the spindle nut 34 is rotated about the rotational axis R by means of the third drive motor 36, the spindle 37 and the support section 39 connected thereto are moved along the rotational axis R. With reference to the intended use of the transport device $10_1$, which is when the first wheel 18 and the second wheel 20 roll on a surface not shown in FIGS. 1A and 1B, the support section 39 is either raised or lowered depending on the direction of rotation of the third drive motor 36. To transport an object 38, for example a pallet 40 (see FIG. 5), the transport device $10_1$ is moved into a cavity of the pallet 40 and then the lifting device 32 is activated such that the support section 39 is raised. The support section 39 is consequently brought into contact with the pallet 40, which is consequently lifted so that it is no longer in contact with the base. Subsequently, the pallet 40 can be moved to the desired location by the transport device $10_1$.

Referring to FIG. 3A, it can be seen that the support section 39 of the lifting device 32 includes a plate 42 and a nop mat 44 connected to the plate 42. The nop mat 44 may, for example, be bonded to the plate 42. The plate 42 is connected to the spindle 37 by means of a clamping sleeve 46. The clamping sleeve 46 also simultaneously attaches to the spindle 37 a plate housing 48, which is open towards the plate 42. An O-ring 50 is inserted into a circumferential groove of the clamping sleeve 46 and seals the clamping sleeve 46 against the plate 42. An axial roller bearing 52 is disposed in the plate housing 48 so that the support section 39 can rotate relative to the plate housing 48 and relative to the rest of the transport device $10_1$. A rubber ring 54 is arranged between the axial roller bearing 52 and the plate 42. The rubber ring 54 allows tilting movements between the plate 42 and the axial roller bearing 52, which are caused by an uneven loading on the support section 39.

Figure 3B:
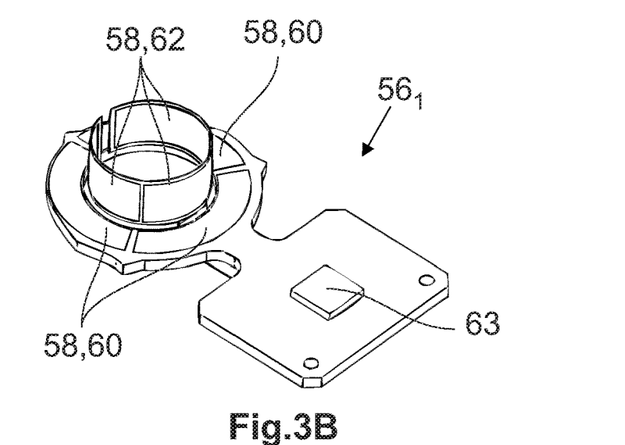
FIG. 3B shows an isolated representation of a force measuring device according to a first embodiment example, which is integrated into the lifting device.

Furthermore, according to a first embodiment example, a force measuring device $56_1$ is arranged in the plate housing 48, which is shown separately in FIG. 3B. In the first embodiment example, the force measuring device $56_1$ comprises a total of six capacitive force sensors 58, which can be subdivided into a first group 60 and a second group 62 with three force sensors 58 each. The main surfaces of the force sensors 58 of the first group 60 lie in a horizontal plane with respect to the intended use of the transport device $10_1$, whereas the main surfaces of the force sensors 58 of the second group 62 are oriented perpendicular to the main surfaces of the force sensors 58 of the first group 60. The force sensors 58 of the first group 60 are formed in a circular ring sector shape, whereas the force sensors of the second group 62 are formed in a cylindrical sector shape. The main surfaces of the force sensors 58 of the second group 62 lie in a vertical plane during the intended use of the transport device $10_1$. Resistive force sensors, strain gauges or printed electronics may also be used instead of the capacitive force sensors 58.

Figure 3C:
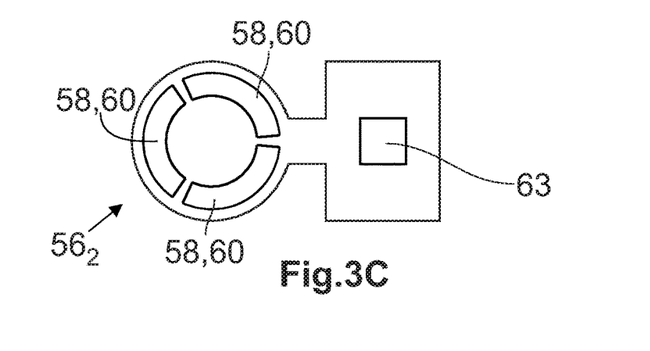
FIG. 3C shows an isolated representation of a force measuring device according to a second embodiment, which is integrated into the lifting device.

FIG. 3C shows a second embodiment example of the force measuring device $56_2$, which essentially differs from the force measuring device $56_1$ according to the first embodiment example in that it has only three capacitive force sensors 58, which can be assigned to the first group 60.

In both cases, it is possible to measure horizontally acting forces and vertically acting forces. In addition, tilting, rotating and sliding movements can be measured depending on how the force sensors 58 are mechanically mounted.

In the first embodiment example of the force measuring device $56_1$, the force sensors 58 of the first group 60 serve to determine vertically acting forces. The force sensors 58 of the second group 62 are used to determine horizontally acting forces. Due to the division of the force sensors 58 into the first group 60 and the second group 62, the various load cases can more precisely be distinguished from one another than in the case with the second embodiment example of the force measuring device $56_2$. Since, in principle, the various load cases can be better described as the number of force sensors 58 increases, it is desirable to increase the number of force sensors 58. However, this increases the space requirement. The arrangement of the force sensors 58 of the first group 60 perpendicular to the force sensors 58 of the second group 62 on the one hand increases the accuracy with which the load cases can be described, and on the other hand keeps the space required for this within reasonable limits.

The force sensors 58 interact with an evaluation unit 63 so that the forces acting on the support section 39 can be determined. In addition, the evaluation unit 63 can be used to determine how the forces are distributed over the support section 39. Due to the degrees of freedom provided by the mounting of the support section 39 in the lifting device 32, certain load cases that are to be determined, such as tilting, can be specified. In addition, the loads that can be determined depend on the arrangement of the force sensors 58 relative to the support section 39.

The information relating to the magnitude and distribution of the forces acting on the support section 39 can be used in various ways, which will be discussed in more detail below. At this point, it should only be pointed out that overloading of the transport device $10_1$ can be prevented. If the force acting on the support section 39 exceeds a certain level, the lifting of the support section 39 can be interrupted, and an appropriate warning signal can be output by means of a signal generator 64 (see FIG. 1B). The warning signal may, for example, be output in optical and/or acoustic form.

Referring to FIG. 1A and FIG. 1B, the transport device $10_1$ comprises a sensor unit 66 with which the environment of the transport device $10_1$ can be sensed. Obstacles and the nature of the surface on which the wheels roll can, in particular, be determined. The sensor unit 66 may comprise cameras 67, ultrasonic sensors 69, laser-based sensors 71 or radar-based sensors or the like, with which the environment can be sensed with sufficient accuracy, including under varying conditions. The sensor unit 66 is arranged in a sensor section 68, which is bounded by the outer contour 14 and by the common axis of rotation D or by a plane passing through the common axis of rotation D and the rotational axis R. As a result of this definition, the transport device $10_1$ has two such sensor sections 68, however the sensor unit 66 is arranged in only one of these sensor sections 68. As a consequence of this arrangement, the sensor unit 66 can only sense the part of the environment which is arranged on the side of the common axis of rotation D or the plane passing through it on which the sensor unit 66 is arranged.

Furthermore, the transport device $10_1$ is equipped with a storage device 70 for electrical energy so that the respective components can be supplied with electrical energy.

As can be seen, in particular, from FIG. 1B, the outer contour 14 is at least in sections rotationally symmetrical with respect to the rotational axis R. In particular the support section 39, the first wheel 18 and the second wheel 20 are furthermore arranged within the outer contour 14. Therefore, no components protrude radially beyond the outer contour 14. This has the effect that when the transport device $10_1$ is rotated on the spot, which can be done by appropriately driving the first wheel 18 and the second wheel 20, there are no eccentric portions that could strike adjacent objects and interfere with rotation, as long as the adjacent objects are at a distance that is at least equal to the radius of the outer contour 14 about the rotational axis R.

It can be seen from FIG. 1A that a bristle section 72 is arranged at the lower edge of the housing 13, which bristle section 72 comprises a plurality of bristles not explicitly visible here. As mentioned, the first wheel 18 and the second wheel 20 are arranged on a common axis of rotation D. As a consequence, the transport device $10_1$ can tilt about the common axis of rotation D so that the housing 13 rests on the base on one side of the common axis of rotation D and then drags along the base when the transport device $10_1$ is moved. This dragging is prevented by the bristle section 72, which also has a stabilizing effect on the transport device $10_1$. Furthermore, the bristle section 72 has the effect of a broom, so that at least smaller particles are removed and cannot negatively influence the rolling of the wheels 18, 20 along the base.

To stabilize the transport device $10_1$ about the common axis of rotation D, one or more support wheels (not shown) may alternatively be used.

In the illustrated embodiment example, the transport device $10_1$ is further equipped with a self-stabilizing device 74 (FIG. 1B) that can sense and counteract any tilt and any change in tilt about the common axis of rotation D of the transport device $10_1$. By way of example, the self-stabilizing device 74 can have a gyroscope or a tilt sensor. If the self-stabilizing device 74 determines that the tilt about the common axis of rotation D exceeds a critical level, the self-stabilizing device 74 may initiate countermeasures. The countermeasures may, for example, consist of selective acceleration or deceleration of the first wheel 18 and/or the second wheel 20. Alternatively, a balancer shaft which is not shown here can be driven or weights also not shown here can be displaced. All measures serve to generate a torque about the axis of rotation D within the transport device $10_1$ that counteracts the inclination, in order to once again reduce the inclination to values below critical. It should be noted that the self-stabilizing device 74 can only be used when no objects are being transported with the transport device $10_1$.

The transport device $10_1$ is furthermore equipped with a communication device 76 with which the transport device $10_1$ can exchange information with other communication partners, which will be discussed in more detail below.

Figure 2:
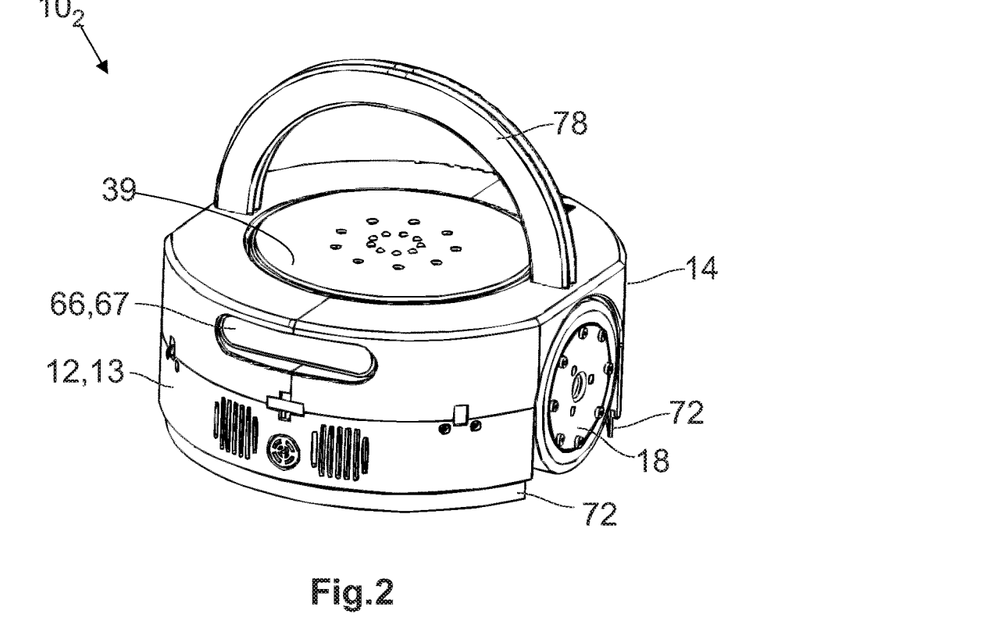
FIG. 2 shows a perspective representation of a second embodiment example of the transport device according to the invention.

FIG. 2 shows a perspective representation of a second embodiment example of the transport device $10_2$ according to the invention. The transport device $10_2$ according to the second embodiment example is largely constructed in the same way as the transport device $10_1$ according to the first embodiment example. In addition, the transport device $10_2$ has a carrying handle 78, which is rotatably fastened to the support structure 12. The transport device $10_1$ can thus be gripped and transported by the carrying handle 78 in the manner of a bucket.

Figure 4:
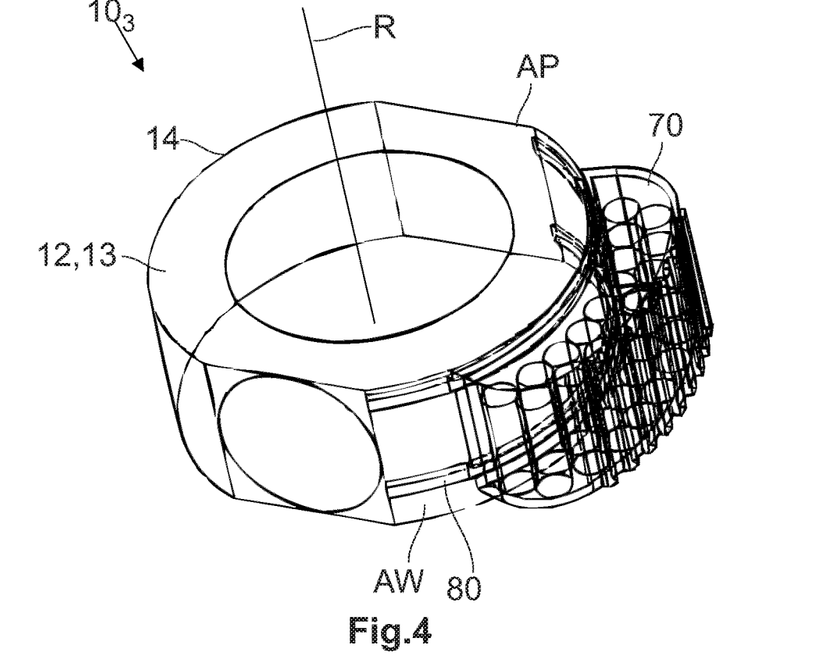
FIG. 4 shows a basic representation of a part of a support structure of the transport device according to the invention according to a third embodiment, on which a storage device for electrical energy is movably fastened to the support structure.

In FIG. 4, a part of a support structure 12 of the transport device $10_3$ according to the invention is illustrated according to a third embodiment on the basis of a basic and perspective view, wherein the support structure 12 is formed as a housing 13. Two circular ring sector-shaped grooves 80 are arranged on one of the two curved outer surfaces AW of the housing 13, in which a storage device 70 for electrical energy can engage in a form-fitting manner and be detachably connected to the housing 13. In this embodiment example, the storage device 70 is therefore arranged outside the housing 13 in the manner of a backpack and forms an eccentric section. The storage device 70 can be moved within the two grooves 80, wherein it rotates about the rotational axis R. The transport device $10_1$ can therefore be moved on the spot, within certain limits, in spaces which are only slightly wider than the housing 13 on the two flat outer surfaces AP. Such spaces can be the cavities of pallets 40. When rotating, the storage device 70 strikes the walls of the pallet 40 and is rotated due to the rotational movement of the transport device $10_1$ along the grooves 80 about the rotational axis R of the transport device $10_1$. The storage device 70 does not hinder further rotation of the transport device $10_1$.

Figure 5:
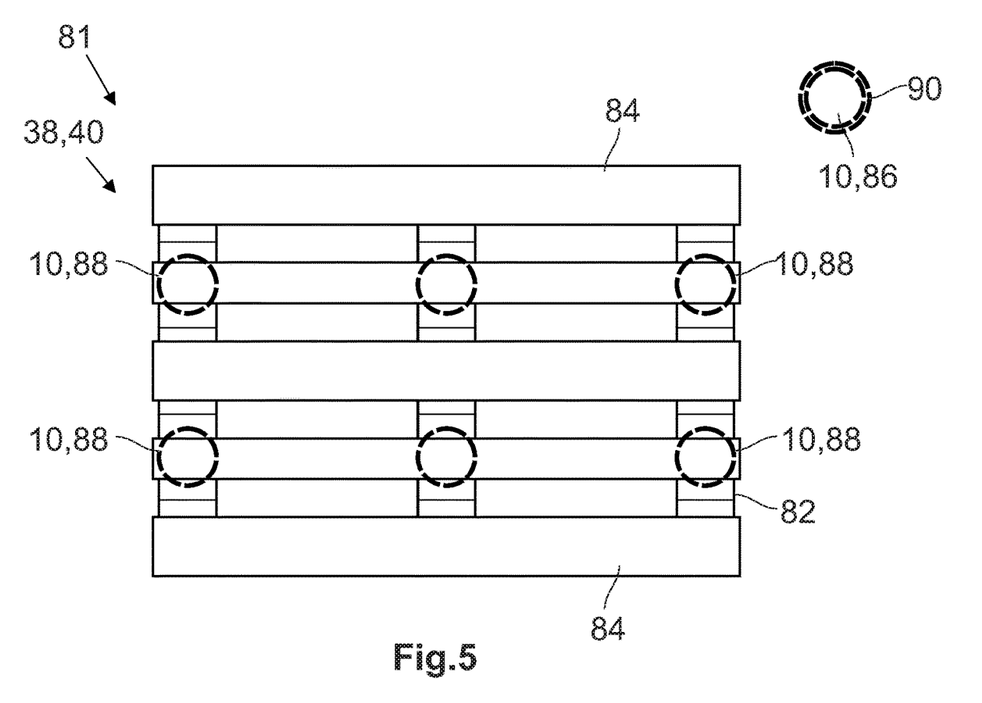
FIG. 5 shows a top view of an object being transported by a transport system.

FIG. 5 shows a top view of an object 38 which can be transported by a transport system 81 according to the present invention. The object 38 is configured as a pallet 40 in FIG. 5, upon which objects not shown in more detail, such as boxes or the like, can be placed. The pallet 40 shown has three crosspieces 82 to which a total of five slats 84 are nailed. Two recesses not visible in FIG. 5 are arranged in each crosspiece 82, each of which is aligned with the recesses of the adjacent crosspieces 82.

The transport system 81 comprises a total of seven transport devices 10, which are described in FIG. 1A and FIG. 1B and the basics of which are shown in FIG. 5. Six of the transport devices 10 are each moved into one of the recesses of the crosspieces 82. The lifting device 32 is then lifted so that the pallet 40 can be removed from the base and can then transported to the desired location. As can also be seen from FIG. 5, a seventh transport device $10_1$ is not inserted into the recesses of the pallet 40. The seventh transport device $10_1$ is configured as a so-called master 86, whereas the other six transport devices 10 are configured as slaves 88. The purpose of the master 86 is, in particular, to sense the environment, since it is positioned outside the pallet 40 and is therefore better able to sense the environment compared to the slaves 88. Using the communication device 76, the master 86 can transmit commands to the slaves 88, in particular related to obstacles.

The master 86 accompanies the slaves 88 until the pallet 40 has been transported to the desired location. Then, the lifting device 32 is accordingly activated so that the pallet 40 is placed back on the base. The slaves 88 then move out of the pallet 40 and can be used to transport another object. The seven transport devices 10 can be identical in construction. However, it is also possible to provide the master 86 with a particularly powerful master sensor unit 90 so that the environment can be sensed over a particularly large scale area.

In the event that the transport devices 10 are of identical design, each of the transport devices 10 can be defined as a master 86 or as a slave 88. The transport devices 10 can therefore be used in different manners. As mentioned, the master 86 serves to sense the environment of the pallet 40 as extensively as possible. For this purpose, the sensor unit 66 requires an above-average amount of electrical energy. Due to the possibility of also using one of the other transport devices 10 as master 86, the storage device 70 of a transport device $10_1$ is prevented from being drained faster than those of the other transport devices 10. Furthermore, all transport devices 10 are loaded equally, which prevents one or more of the transport devices 10 from wearing out faster and requiring maintenance sooner than others. To transport the other object 38, another of the transport devices 10 can be used as a master 86.

Figure 6A:
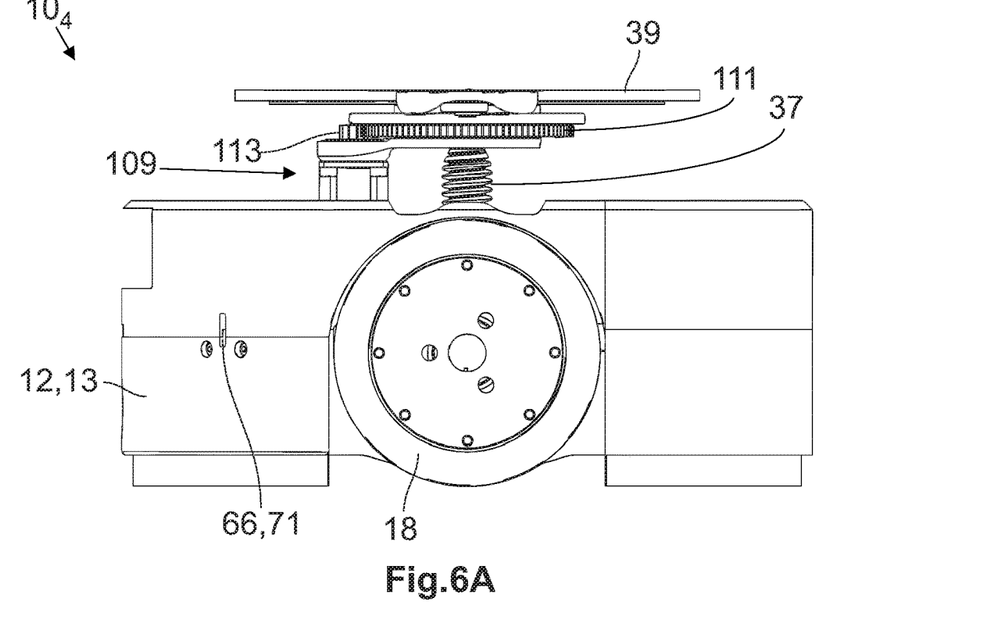
FIG. 6A shows a side view of a third embodiment example of the transport device according to the invention, comprising an expanding unit.
Figure 6B:
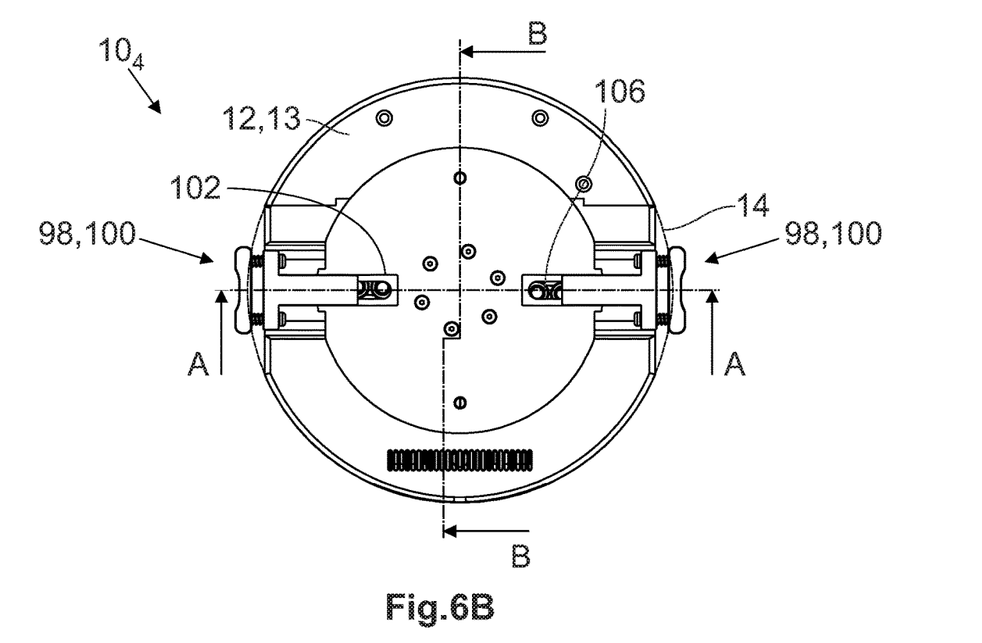
FIG. 6B shows a top view of the third embodiment example of the transport device according to the invention shown in FIG. 6A.
Figure 6C:
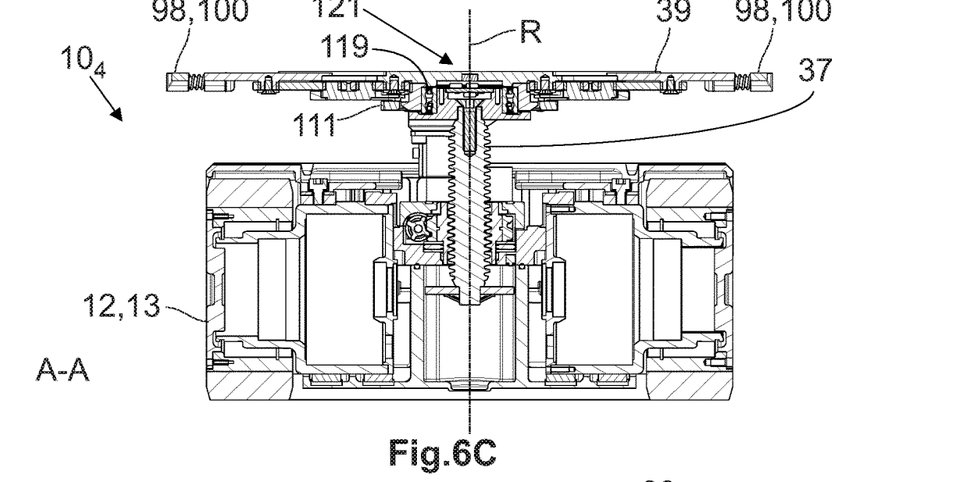
FIG. 6C shows a cross-sectional representation through the third embodiment example of the transport device along the sectional plane A-A defined in FIG. 6B.
Figure 6D:
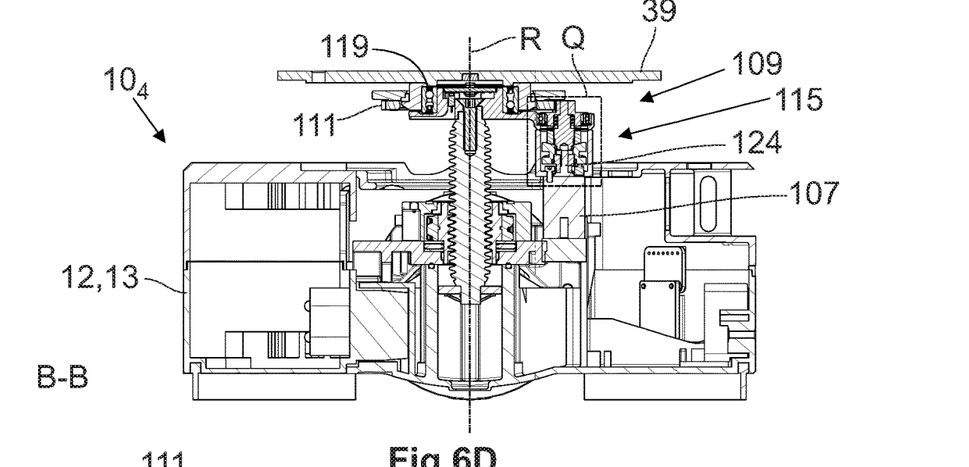
FIG. 6D shows a cross-sectional representation through the third embodiment example of the transport device along the sectional plane B-B defined in FIG. 6B.
Figure 6E:
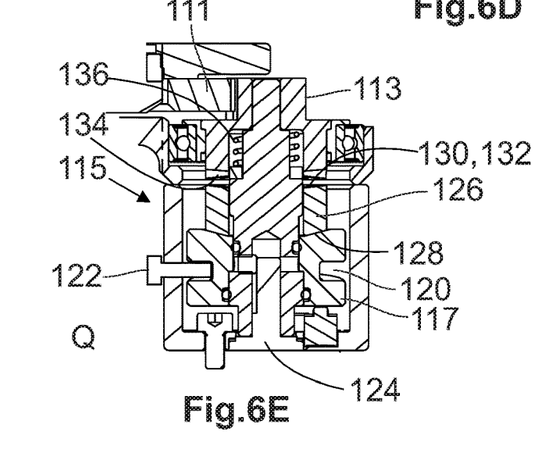
FIG. 6E shows an enlarged representation of the section Q marked in FIG. 6D.

A fourth embodiment example of the transport device $10_4$ according to the proposal is shown by means of a side view in FIG. 6A and by means of a top view in FIG. 6B. FIGS. 6C to 6E show cross-sectional views of a fourth embodiment example of the transport device $10_4$ according to the proposal. The basic construction of the transport device $10_4$ according to the fourth embodiment example largely corresponds to that of the previously described embodiment examples, so that only the differences will be discussed below.

The transport device $10_4$ according to the fourth embodiment example comprises an expanding unit 98, which in the fourth embodiment example of the transport device $10_4$ comprises two expanding arms 100 that are adjustable between a first position and a second position by means of an adjustment unit 106. In FIG. 6B, the two expanding arms 100 are shown in a second position in which the expanding arms 100 protrude beyond the outer contour 14 of the support structure 12. In the first position, which is not shown, the expanding arms 100 are located within the outer contour 14, so that there are no eccentric portions that could strike adjacently disposed objects 38 when the transport device $10_4$ is rotated in place and which could therefore impede rotation. The expanding arms 100 are slidably mounted in guide rails 102, the guide rails 102 being formed by grooves disposed in the support section 39. The guide rails 102 extend radially outwardly from the center of the transport device $10_4$ so that the expanding arms 100 can be moved in a radial direction.

For the purpose of moving the expanding arms 100 between the first and the second position, the expanding unit 98 comprises, in addition to the adjustment unit 106, a further drive unit 107, which are both described in more detail below, in particular with reference to FIGS. 6C to 6E. The adjustment unit 106 and the further drive unit 107 interact through the use of a drive train 109. The drive train 109 extends eccentrically with respect to the axis of rotation R and comprises a first cogwheel 111 and a second cogwheel 113 which are in meshing engagement with each other, which can be seen in particular from FIG. 6A. The first cogwheel 111 is non-rotatably connected to the support section 39. This allows the rotary motion of the further drive unit 107 to be transmitted to the adjustment unit 106. The rotary motion can be used to move the expanding arms 100 between the first position and the second position. The mechanisms used for this purpose will be discussed in more detail below.

As previously mentioned, the spindle 37 is mounted in a rotationally fixed manner in the support structure 12. In order to be able to move the support section 39 and consequently also the expanding unit 98 relative to the housing 13, a corresponding bearing unit 119 is provided. An angle sensor 121 is provided to determine the rotational position of the expanding unit 98, for example with respect to the first axis of rotation D1 and/or the second axis of rotation D2.

A decoupling unit 115 is arranged in the drive train 109, with which the drive train 109 can be selectively opened and closed. The decoupling unit 115 has the following purpose: The expanding arms 100 serve to brace the transport device $10_4$ in the second position with the object 38 to be transported, in particular with a pallet 40 (see FIG. 5), in order to prevent uncontrolled slippage. However, it would then not be possible, without further ado, to rotate the transport device $10_4$ when in the braced state, in particular for steering, since otherwise the resistance present in the drive train 109 and in the further drive unit 107 would need to be overcome.

Figure 6F:
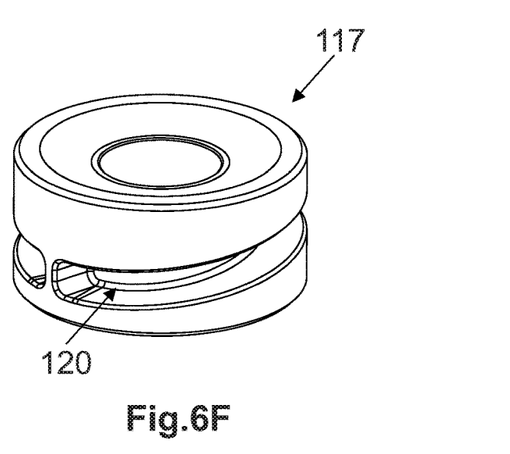
FIG. 6F shows an isolated representation of an actuator of a decoupling unit.

The decoupling unit 115 comprises a cam disk 117, which is shown separately in FIG. 6F. The cam disk 117 is connected to an output shaft 124 of the further drive unit 107 in a rotationally fixed but axially displaceable manner. The cam disk 117 has a groove 120 in the lateral surface with a helical course and a certain pitch. A pin 122 anchored in the support structure 12 projects into the groove 120 (FIG. 6E). When the cam disk 117 is rotated by the output shaft 124, it performs a translatory motion parallel to the rotational axis R in addition to the rotational motion. The translatory movement of the cam disk 117 is transmitted to a coupling element 126, which is ring-shaped. The coupling element 126 comes into contact with the cam disk 117 via a first end face 128. On a second end face 130, the coupling element 126 has a first spur gear 132 which, depending on its position, can engage with a corresponding second spur gear 134 of the second cogwheel 113. In the operating state shown in FIG. 6E, the first spur gear 132 and the second spur gear 134 are not engaged. When the first spur gear 132 and the second spur gear 134 are engaged, the rotational movement of the output shaft 124 of the further drive unit 107 is transmitted to the first cogwheel 111, thereby moving the expanding arms 100. Depending on the direction of rotation of the output shaft 124, the coupling element 126 is moved from the cam disk 117 toward or away from the second cogwheel 113. Accordingly, the first spur gear 132 and the second spur gear 134 can be engaged or disengaged. To ensure contact between the cam disk 117 and the coupling element 126, the coupling element 126 interacts with a return spring 136.

If, for example, the expanding arms 100 are moved from the second position to the first position and the further drive unit 107 is further rotated in that direction after reaching the first position, this causes the support section 39 to rotate. In this way, the expanding unit 98 and consequently the expanding arms 100 can be brought into any rotational position relative to the support structure 12 or the housing 13. The rotational position can be determined with the angle sensor 121. In a similar manner, this applies when the expanding arms have reached the second position.

Figure 7A:
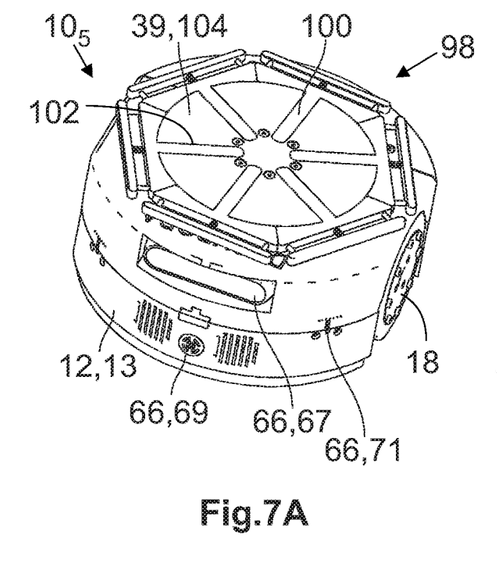
FIG. 7A shows a perspective representation of a fourth embodiment example of the transport device according to the invention, comprising an expanding unit.

In FIGS. 7A, a fifth embodiment of the transport device $10_5$ according to the invention is shown by means of a perspective representation. The construction of the transport device $10_5$ according to the fifth embodiment is largely similar to that of the fourth embodiment of the transport device $10_4$, in particular with respect to the construction of the drive train 109 and the adjustment unit 106.

Figure 7B:
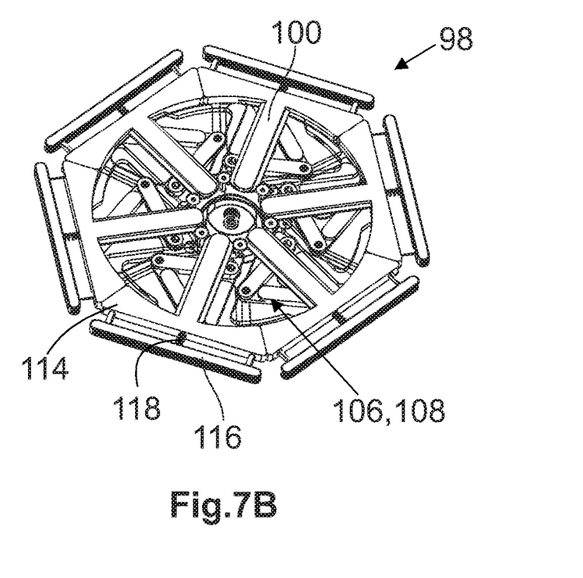
FIG. 7B shows the expanding unit of the transport device according to the fourth embodiment example in an isolated top view, wherein the expanding unit is in a first position.
Figure 7C:
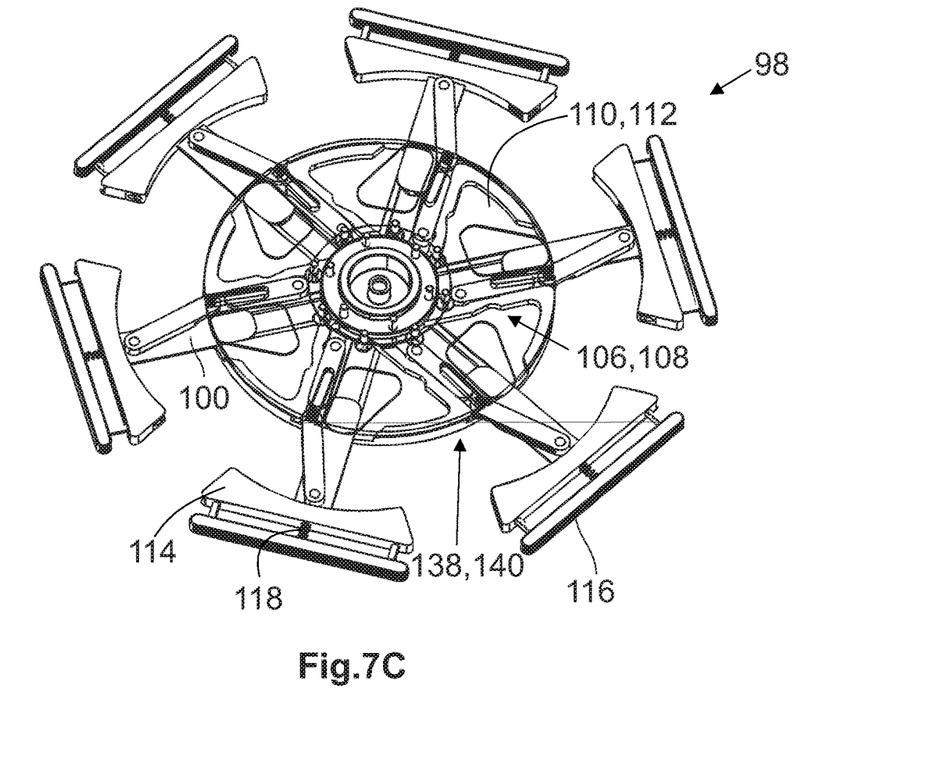
FIG. 7C shows the expanding unit shown in FIG. 7B, in a second position, on the basis of a bottom view.

The expanding unit 98 comprises a total of six expanding arms 100, which are in a first position in FIG. 7B and in a second position in FIG. 7C. The expanding arms 100 are also in the first position in FIG. 7A. It can be seen that the expanding arms 100 do not protrude beyond the outer contour 14 of the support structure 12 when the expanding arms 100 are in the first position. As in the fourth embodiment example of the transport device $10_4$, the expanding arms 100 are slidably mounted in the guide rails 102, wherein the guide rails 102 extend from grooves arranged in the support section 39 so that the support section 39 forms a corresponding number of circular vector elements 104 (see FIG. 7A). For illustration reasons, the circular vector elements 104 are not shown in FIG. 7C.

The guide rails 102 extend radially outward from the center of the transport device $10_4$ so that the expanding arms 100 can also move in a radial direction, as can also be seen from a comparison of FIG. 7B and FIG. 7C. The adjustment unit 106 comprises one toggle lever unit 108 for each expanding arm 100, which can be extended or compressed by rotating a synchronization unit 110, which comprises a connecting link disc 112 in the illustrated embodiment. By extending the toggle lever unit 108, the expanding arms 100 are moved radially outward to the second position, and by compressing the toggle lever unit 108, they are moved to the first position. Since the connecting link disc 112 interacts with all of the toggle lever units 108 in the same manner, all of the expanding arms 100 are moved simultaneously when the connecting link disc 112 is rotated.

The expanding unit 98 includes a locking device 138 with which the adjustment unit 106 can then be locked at least when the expanding arms 100 are in the second position. In the fifth embodiment example of the transport device, the locking device 138 is implemented in the following manner: The connecting link disc 112 interacts with the toggle lever units 108 in such a way that the two legs of the toggle lever units 108 are moved beyond an angle of 180° in the second position, and consequently are overcompressed and rest against a stop 140 in the second position. In so doing, this locks the expanding arms 100 in the second position without the need to apply a locking force. In so doing, it is possible to keep the expanding arms 100 in the second position even when the drive train 109 is open. In this respect, the locking device 138 is largely formed by the adjustment unit 106 itself, so that no additional elements need to be provided for this purpose. Alternatively, however, the locking device 138 may comprise one or more movable bolts or the like with which the adjustment unit 138 can be locked.

In addition, there is respectively one stop element 114 that is connected to each radially outer end of the expanding arms 100. As can, in particular, be seen from FIG. 7A and FIG. 7B, in the first position, the stop elements 114 strike on the one hand against the two respective adjacent stop elements 114. Furthermore, the stop elements 114 also strike the circular vector elements 104. This clearly defines the first position of the expanding arms 100.

A support element 116 is movably fastened to each of the stop elements 114, wherein the support elements 116 are pre-tensioned by means of a spring 118.

As shown, in particular, in FIG. 5, a pallet 40 may be transported, for example, with a total of six transport devices 10. If transport devices $10_4$, $10_5$ according to the fourth or fifth embodiment examples are used, they are moved into a cavity of the pallet 40 until they are located in the area of the previously mentioned crosspiece 82. In this case, the expanding unit 98 is in the first position.

The lifting device is first activated once the transport device $10_4$, $10_5$ has reached the desired position within the cavity, which lifting device raises the pallet 40. The expanding unit 98 is then activated, so that the expanding arms 100 are moved from the first position to the second position. In so doing, the support elements 116 come into contact with the side walls of the cavity of the pallet 40, whereby the transport device $10_4$, $10_5$ is frictionally connected to the pallet 40. In this process, the springs 118 are compressed so that impact-type loads are avoided. Furthermore, the support elements 116 can be floatingly mounted so that manufacturing deviations can be compensated for together with the springs 118. As a result, the transport device $10_4$, $10_5$ is aligned in a defined manner with respect to the pallet 40. As a consequence, the pallet 40 can no longer shift relative to the transport device $10_4$, $10_5$. The pallet 40 can now be moved to the desired destination location by means of the transport device $10_5$.

As mentioned, the transport device $10_5$ according to the fifth embodiment example differs, in particular, in the number of expanding arms 100 from the transport device $10_4$ according to the fourth embodiment example. Due to the larger number of expanding arms 100, the use of the angle sensor 121 can be dispensed with since the expanding unit 98 can align itself in such a way that the expanding arms 100 run largely parallel to the surface of the object 38 with which the transport device $10_4$ is to be braced.

Figure 8:
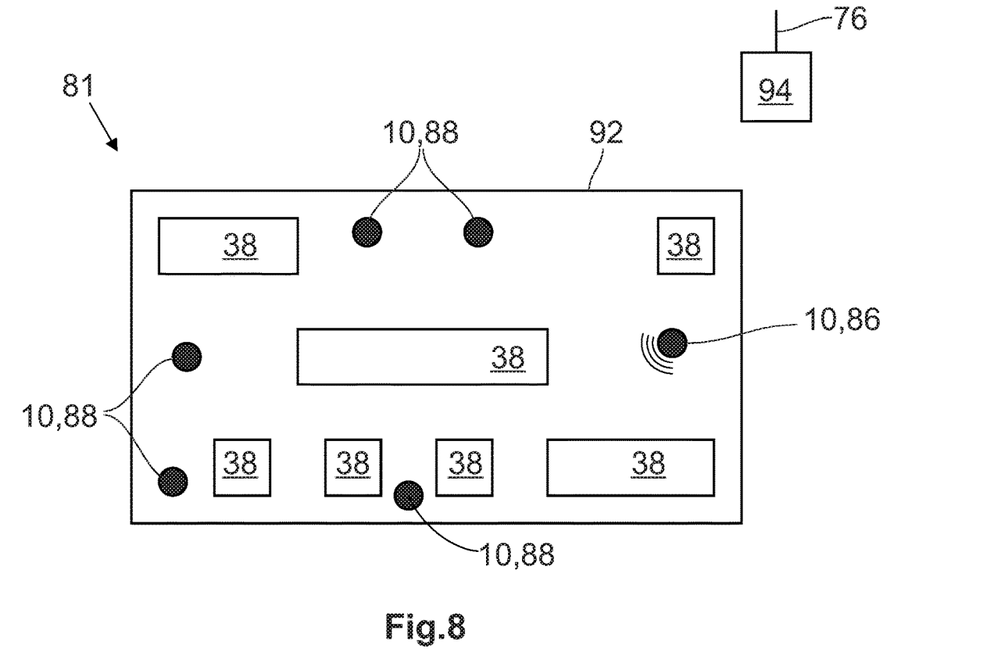
FIG. 8 shows a loading surface which is loaded with a plurality of objects while using a transport system.

FIG. 8 shows a transport system 81 having a total of six transport devices 10, which devices are distributed within a workshop 92. Various objects are stored in the workshop 92, which objects are to be transported by the transport system 81. The transport system 81 comprises a control unit 94 with which the transport devices 10 can be controlled or regulated. As mentioned above, the transport devices 10 are equipped with communication devices 76 (see FIG. 1B), which devices enable the exchange of information between them. The control unit 94 is also equipped with such a communication device 76, so that not only is an exchange of information between the transport devices 10 possible, it is also possible to have an exchange of information between the transport devices 10 and the control unit 94.

The control unit 94 may, for example, define tasks to be performed by the transport devices 10, which may comprise, for example, transporting the various objects 38 from one location to the destination location. As mentioned, the transport devices 10 are located within a workshop 92. The control unit 94 may be located outside the workshop 92, however, it may also be located within the workshop 92. The communication device 76 uses a wireless network for the exchange of information, for example a WLAN or Bluetooth network. However, depending on the configuration and size of the objects, it is not always guaranteed that the WLAN is available to a sufficient extent within the entire workshop 92. However, the functionality of the transport system depends on a sufficiently available WLAN. To stabilize the WLAN, some or all of the transport devices 10 may be operated in the manner of a repeater or relay station to ensure that the WLAN is available even in the corners of the workshop 92 or behind or under the objects. As described in connection with FIG. 5, one or more of the transport devices 10 may be operated as a master 86. As also noted, the primary purpose of the master 86 is to sense the environment around the object 38 being transported, however, the master 86 may also be positioned so that the WLAN network is available to at least the slaves 88 associated with it.

Figure 9:
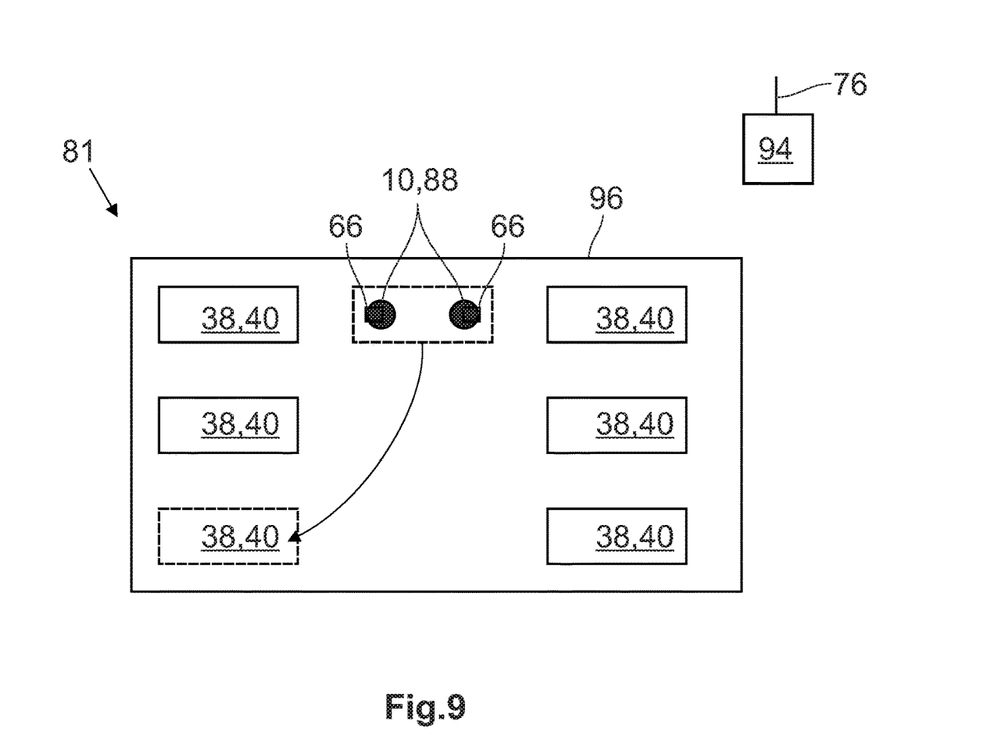
FIG. 9 shows a workshop in which a transport system is implemented.

FIG. 9 shows a loading surface 96, for example, that of a truck, which is being loaded with the transport system 81 according to the invention. Based on the fact that the force acting on the support section 39 of at least one transport device 10 according to one of the previously described embodiment examples can be determined by means of the force measuring device 56, it is possible that this information can also be used to load the loading surface 96 of the truck as uniformly as possible. In the example shown in FIG. 9, the loading surface 96 is to be loaded with a total of six pallets 40, which should have the same weight, but which the transport system 81 cannot initially assume. The transport system 81 first places a total of three pallets 40 in a first row next to each other and registers the precise positions and the weight of the respective pallets 40 on the loading surface 96. Subsequently, the transport device $10_1$ transports a fourth pallet 40 in a second row and finally a fifth and a sixth pallet 40 into a third row. After the sixth and last pallet 40 has also been transported to the loading surface 96, the transport system 81 receives information that no further pallets 40 are to be loaded onto the loading surface 96. The transport system 81 determines that the loading surface 96 is unevenly loaded. The transport system 81 changes the position of the fourth loading surface 96 so that the loading surface 96 is now evenly loaded. The position of the fourth loading surface 96 is changed as indicated by the arrow.

As mentioned, the transport devices 10 each comprise a signal generator 64 (see FIG. 1B). The signal generator 64 may output a warning signal when the pallets 40 are heavy enough to exceed the maximum load of the respective transport devices 10. Exceeding the maximum load may be detected by the force measuring device 56.

Moreover, it can be seen from FIG. 9 that the sensor units 66 of the transport devices 10 are oriented in opposite directions. One of the transport devices 10 senses the environment on one side of the pallet 40, whereas the other transport device 10 senses the environment on the other side of the pallet 40.

REFERENCE LIST

10 Transport device
10₁-10₅ Transport device
12 Support structure
13 Housing
14 Outer contour
16 Chassis
18 First wheel
20 Second wheel
22 Drive unit
24 First drive motor
26 Second drive motor
28 First transmission
30 Second transmission
32 Lifting device
34 Spindle nut
36 Third drive motor
37 Spindle
38 Object
39 Support section
40 Pallet
42 Plate
44 Nop mat
46 Clamping sleeve
48 Plate housing
50 O-Ring
52 Axial roller bearing
54 Rubber ring
56 Force measuring device
58 Force sensors
60 First group
62 Second group
63 Evaluation unit
64 Signal generator
66 Sensor unit
67 Camera
68 Sensor section
69 Ultrasonic sensor
70 Storage device
71 Laser-based sensor
72 Bristle section
72 Self-stabilizing device
76 Communication device
78 Carrying handle
80 Groove
81 Transport system
82 Crosspiece
84 Slat
86 Master
88 Slave
90 Master sensor unit
92 Workshop
94 Control unit
96 Loading surface
98 Expanding unit
100 Expanding arm
102 Guide rail
104 Circular vector element
106 Adjustment unit
107 Further drive unit
108 Toggle lever unit
109 Drive train
110 Synchronization unit
111 First cogwheel
112 Connecting link disc
113 Second cogwheel
114 Stop element
115 Decoupling unit
116 Support element
117 Cam disk
118 Spring
119 Bearing unit
120 Groove
121 Angle sensor
122 Pin
124 Output shaft
126 Coupling element
128 First end face
130 Second end face
132 First spur gear
134 Second spur gear
136 Return spring
138 Locking device
140 Stop
AP Flat outer surface
AW Curved outer surface
D Common axis of rotation
D1 First axis of rotation
D2 Second axis of rotation
R Rotational axis

The invention claimed is:

1. Driverless transport device (10) for transporting objects (38), comprising a support structure (12) with an outer contour (14), a chassis (16) fastened to the support structure (12) having at least a first wheel (18) and a second wheel (20), wherein the first wheel (18) is rotatably mounted in the chassis (16) about a first axis of rotation (D1) and the second wheel (20) is rotatably mounted in the chassis (16) about a second axis of rotation (D2), a drive unit (22), said drive unit (22) including a first drive motor (24) connected to the first wheel (18) and a second drive motor (26) connected to the second wheel (20), wherein the first and second drive motors (24) (26) are configured to be independently operable such that the first and second wheels (18) (20) can be driven independently of one another, and an expanding unit (98), wherein the expanding unit (98) comprises:

a plurality of guide rails (102) extending radially outwardly from a center of the driverless transport device (10);

a plurality of expanding arms (100), wherein each expanding arm (100) of the plurality of expanding arms (100) is slidably mounted to a respective guide rail (102) of the plurality of guide rails (102), wherein each expanding arm (100) of the plurality of expanding arms (100) is movable between a first position and a second position and each one expanding arm (100) in the second position thereof projects at least partially beyond the outer contour (14);

a synchronization unit (110) including a connecting link disc (112), wherein the connecting link disc (112) is rotatable; and an adjustment unit (106), wherein the adjustment unit (106) includes a plurality of toggle lever units (108), wherein each toggle lever unit (108) of the plurality of toggle lever units (108) connects the connecting link disc (112) with a respective expanding arm (100) of the plurality of expanding arms (100), wherein each toggle lever unit (108) of the plurality of toggle lever units (108) includes:

a first elongated member and a second elongated member, the first and second elongated members being pivotally coupled to one another, wherein the first elongated member of each toggle lever unit (108) is pivotally coupled to the connecting link disc (112), and the second elongated member of each toggle lever unit (108) is pivotally coupled to a respective one of the expanding arms (100), wherein a rotation of the connecting link disc (112) is configured to pivot the first and second elongated member of each toggle lever unit (108) relative to one another, and in turn, to move the plurality of expanding arms (100) between the first position thereof and the second position thereof;

wherein the expanding unit (98) is implemented rotatable relative to the chassis.

2. Driverless transport device (10) according to claim 1, characterized in that the expanding unit (98) comprises a further drive unit (107) and a drive train (109) with which the further drive unit (107) interacts with the adjustment unit (106).

3. Driverless transport device (10) according to claim 2, characterized in that a decoupling unit (115) is arranged in the drive train (109), with which decoupling unit the further drive unit (107) can be separated from the adjustment unit (106).

4. Driverless transport device (10) according to claim 1, characterized in that the expanding unit (98) comprises a locking device (138), with which the adjustment unit (106) may, at least, be locked when each one of the expanding arms (100) is in the second position.

5. Driverless transport device (10) according to claim 1, characterized in that the expanding unit (98) comprises an angle sensor (121), wherein a rotational position of a first expanding arm (100) of the plurality of expanding arms (100) is determined with respect to the first axis of rotation (D1) and/or the second axis of rotation (D2) by using the angle sensor (121).

6. Driverless transport device (10) according to claim 1, characterized in that each guide rail (102) of the plurality of guide rails (102) extends from a respective groove in a support section (39).

7. Driverless transport device (10) according to claim 1, characterized in that each expanding arm (100) included in the plurality of expanding arms (100) has a radially outer end, and a support element (116) is connected to the radially outer end of each said expanding arm (100) of the plurality of expanding arms (100).

8. Driverless transport device (10) according to claim 1, characterized in that each expanding arm (100) included in the plurality of expanding arms (100) has a radially outer end, and a stop element (114) is connected to the radially outer end of each said expanding arm (100) of the plurality of expanding arms (110), wherein the stop element (114) of a first expanding arm (100) in the first position thereof rests against a stop element (114) of an adjacent second expanding arm (100) when the adjacent second expanding arm (100) is in the first position thereof, and/or wherein the stop element (114) of the first expanding arm (100) in the first position thereof rests against a stop surface of the support structure (12).

9. Driverless transport device (10) according to claim 1, characterized in that the driverless transport device (10) comprises a lifting device (32) interacting with the support structure (12) for raising and lowering at least one support section (39) of the lifting device (32), the at least one support section (39) configured to be in contact with the objects (38) for transporting the objects (38).

10. Driverless transport device (10) according to claim 9, characterized in that
the outer contour (14) of the support structure (12) is substantially rotationally symmetrical about a rotational axis (R) in a top view, and
the at least one support section (39) or the first and second wheels (18, 20) are arranged within the outer contour (14) or are flush with the outer contour (14) or
each expanding arm (100) of the plurality of expanding arms (100) is arranged within the outer contour (14) when in the first position.

11. Driverless transport device (10) according to claim 1, characterized in that the transport device (10) comprises a storage device (70) for electrical energy which, in a top view, protrudes in sections beyond the outer contour (14) of the support structure (12), wherein the storage device (70) is movably fastened to the support structure (12).

12. Driverless transport system (81) comprising
a plurality of driverless transport devices (10) according to claim 1,
a control unit (94) for controlling or regulating the driverless transport devices (10), and
a communication device (76) with which information can be exchanged between the control unit (94) and the driverless transport devices (10).

* * * * *

UNITED STATES PATENT AND TRADEMARK OFFICE
CERTIFICATE OF CORRECTION

PATENT NO. : 12,325,613 B2
APPLICATION NO. : 17/772864
DATED : June 10, 2025
INVENTOR(S) : Matthias Huber et al.

Page 1 of 1

It is certified that error appears in the above-identified patent and that said Letters Patent is hereby corrected as shown below:

In the Claims

Claim 1, Column 18, Line 54, please delete the phrase "and each one expanding arm" and replace with "and each expanding arm".

Signed and Sealed this
Twenty-ninth Day of July, 2025

Coke Morgan Stewart
*Acting Director of the United States Patent and Trademark Office*